US009141186B2

(12) United States Patent
Dunko et al.

(10) Patent No.: US 9,141,186 B2
(45) Date of Patent: Sep. 22, 2015

(54) SYSTEMS AND METHODS FOR PROVIDING ACCESS TO MEDIA CONTENT

(75) Inventors: Gregory A. Dunko, Cary, NC (US); Charles Curtiss Hunt, Wake Forest, NC (US)

(73) Assignee: HTC CORPORATION, Taoyuan (TW)

(*) Notice: Subject to any disclaimer, the term of this patent is extended or adjusted under 35 U.S.C. 154(b) by 447 days.

(21) Appl. No.: 13/572,792

(22) Filed: Aug. 13, 2012

(65) Prior Publication Data

US 2013/0254662 A1 Sep. 26, 2013

Related U.S. Application Data

(63) Continuation-in-part of application No. 13/427,275, filed on Mar. 22, 2012.

(51) Int. Cl.
G06F 3/01 (2006.01)
G06F 3/0481 (2013.01)
G06F 3/00 (2006.01)

(52) U.S. Cl.
CPC ............... G06F 3/01 (2013.01); G06F 3/0481 (2013.01)

(58) Field of Classification Search
CPC combination set(s) only.
See application file for complete search history.

(56) References Cited

U.S. PATENT DOCUMENTS

| 2009/0012959 | A1* | 1/2009 | Ylivainio et al. ............. 707/7 |
| 2009/0132077 | A1* | 5/2009 | Fujihara et al. ............. 700/94 |
| 2011/0246440 | A1* | 10/2011 | Kocks et al. ............. 707/706 |
| 2011/0317192 | A1* | 12/2011 | Fukuoka et al. ............. 358/1.13 |
| 2012/0036485 | A1* | 2/2012 | Watkins et al. ............. 715/863 |
| 2012/0311445 | A1* | 12/2012 | Cabanilla et al. ............. 715/716 |
| 2013/0300674 | A1* | 11/2013 | Davidson ............. 345/173 |
| 2014/0218387 | A1* | 8/2014 | Feinstein ............. 345/592 |
| 2014/0310749 | A1* | 10/2014 | Ellis ............. 725/47 |

* cited by examiner

Primary Examiner — Amy Ng
Assistant Examiner — Toan Vu
(74) Attorney, Agent, or Firm — McClure, Qualey & Rodack, LLP

(57) ABSTRACT

Systems and methods for providing access to media content are provided. A representative method includes: generating a user interface on a touchscreen display, the user interface comprising first selection components for surfacing first elements and second selection components for surfacing second elements such that the first selection components are utilized to sort the first elements and the second selection components are utilized to sort the second elements, each of the elements corresponding to a media file; and arranging the second selection components, with at least a portion of the first selection components and the second selection components being positioned in an overlying relationship such that a first location on the user interface corresponds to each of a first media file associated with the first selection components and a second media file associated with the second selection components.

18 Claims, 18 Drawing Sheets

SYSTEMS AND METHODS FOR PROVIDING ACCESS TO MEDIA CONTENT

CROSS REFERENCE TO RELATED APPLICATION

This application is a Continuation-in-Part application that claims priority to U.S. patent application Ser. No. 13/427,275, filed Mar. 22, 2012, the entire content of which is incorporated by reference herein.

BACKGROUND

With the rapid development in communications technology, mobile computing devices have become an integral part of many people's lives given the portability and the growing number of applications available on mobile devices. Today, individuals can perform a wide range of functions via mobile devices such as music and video playback. However, there is an ever-increasing desire to provide other means of managing and providing access to media content.

SUMMARY

Briefly described, one embodiment, among others, is a system for providing access to media content comprising: a computing device having a touchscreen display; and a user interface application executable in the computing device, the user interface application comprising: logic configured to generate a user interface on the touchscreen display, the user interface comprising first selection components and second selection components, the first selection components for surfacing first elements, the second selection components for surfacing second elements such that the first selection components are utilized to sort the first elements and the second selection components are utilized to sort the second elements, each of the elements corresponding to a media file; and logic configured to arrange the first selection components and the second selection components with at least a portion of the first selection components and the second selection components being positioned in an overlying relationship such that a first location on the user interface corresponds to each of a first media file associated with the first selection components and a second media file associated with the second selection components.

Another embodiment is a method for providing access to media content implemented in a computing device that comprises: generating a user interface on a touchscreen display of the computing device, the user interface comprising first selection components and second selection components, the first selection components for surfacing first elements, the second selection components for surfacing second elements such that the first selection components are utilized to sort the first elements and the second selection components are utilized to sort the second elements, each of the elements corresponding to a media file; and arranging the first selection components and the second selection components with at least a portion of the first selection components and the second selection components being positioned in an overlying relationship such that a first location on the user interface corresponds to each of a first media file associated with the first selection components and a second media file associated with the second selection components.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
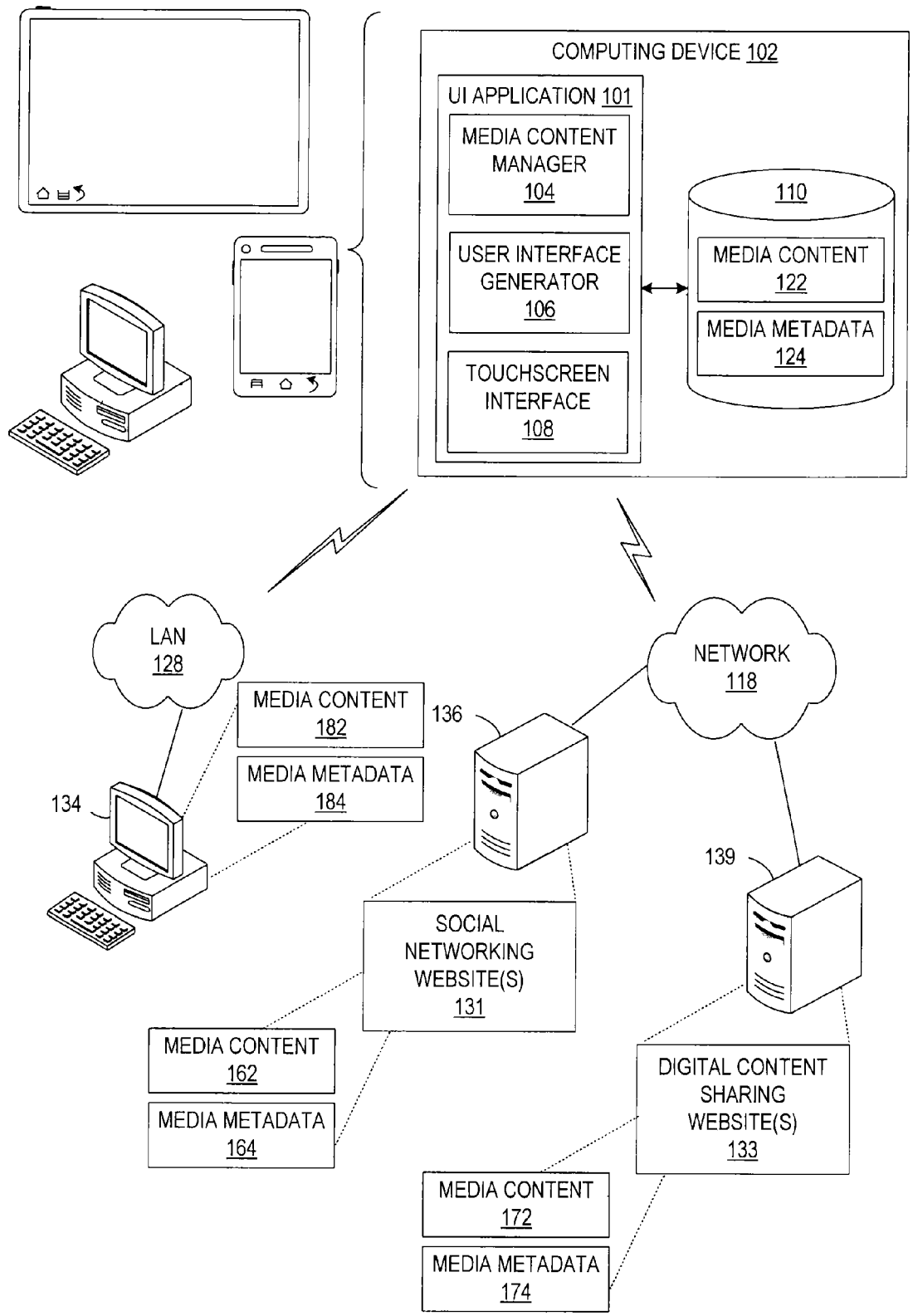
FIG. 1 is a block diagram of an environment in which embodiments of a system for providing access to media content may be implemented.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

With the rapid development in communications technology, mobile computing devices have become an integral part of many people's lives given the portability and the growing number of applications available on mobile devices. Today, individuals can perform a wide range of functions via mobile devices such as music and video playback. Furthermore, with the popularity of social networking sites, such media content as digital photographs, videos, etc. may be found not only on an individual's mobile computing device but also on various social networking sites as well as media content sharing websites where, for example, friends may post and tag photos and videos that people may download.

Large amounts of digital media content are commonly downloaded to a computer or uploaded to an Internet-based image storing service. With wirelessly connected devices, it is possible to send this content to a storage service as soon as the image is captured. This content is then available to any Internet connected device or media server. Increasingly, mobile computing devices with integrated digital cameras are equipped with the ability to time-tag and\or tag with a location identifier (e.g., via a geotag or other type of location tag) captured images. Thus, captured images may have associated metadata that includes such information as the time and date of image capture, the location where the image was captured, and even information about the captured content such as subject identity or event.

When uploading captured images to a web album hosted by an Internet-based image storing service, the user can edit the tags associated with the captured images in order to classify and organize the massive amount of content. Many people store their captured images on such digital content sharing websites (e.g., Google Picassa®, Flickr®) to share the captured images with families and friends.

With the widespread use of mobile computing devices such as smartphones and tablets, many individuals turn to media management tools to archive and organize media content stored on the mobile computing device. Such media management tools offer means for accessing digital content such as music files, video files, digital photographs, documents, and so on. However, many media management tools offer limited means for organizing and sorting media content. Furthermore, manually identifying media content and sorting through a large volume of files for future access can be tedious and time-consuming. Even with the availability of tags and other metadata associated with captured image, searches still require the user to manually select and consolidate captured images to create an album, slideshow, etc. A need therefore exists for an improved means for efficiently accessing media content.

Various embodiments are described for facilitating access to media content by providing graphical user interfaces that allow enhanced navigation of media content via a combination of touch gestures (e.g., slide, pinch, multi-finger rotation) to provide device interaction. The user interfaces generated in accordance with various embodiments allow touch actions to be combined to create user interfaces for arranging and accessing content. End users are able to access media content, where elements comprising thumbnail graphics, icons, etc. corresponding to the media content are arranged according to one or more criteria specified by the user and where the content comprises digital images, audio files, video files, etc.

A description of a system for providing access to media content is now described followed by a discussion of the operation of the components within the system. FIG. 1 is a block diagram of a computing device 102 configured to provide a user interface that facilitates navigation of media content arranged according to one or more criteria. The computing device 102 may be embodied as a mobile computing device, such as by way of example and without limitation, a smartphone, tablet, or other similar device. The computing device 102 comprises a user interface application 101, which further comprises a media content manager 104, a user interface generator 106, and a touchscreen interface 108. The computing device 102 also includes a media content database 110 or other data store structure for storing media content 122 and associated metadata 124.

The media content manager 104 is configured to update the media content database 110 and search the media content database 110 for media content 122 corresponding to user input comprising, for example, touch gestures (e.g., slide, pinch, multi-finger rotation). In accordance with some embodiments, the user interface generator 106 is further configured to receive selections from a user for purposes of constructing a user interface. In this regard, a user can fully customize controls on the user interface for sorting and providing access to media content 122 via touch gestures. The touchscreen interface 108 is configured to receive input from the user via a touchscreen display on the computing device 102.

As shown in FIG. 1, the computing device 102 may be coupled to a network 118 such as the Internet and may communicate with various remote entities such as, for example, social networking server(s) 136 hosting social networking website(s) 131 and digital content sharing server(s) 139 hosting digital content sharing website(s) 133, where the servers 136, 139 store digital media content 162, 172 and corresponding metadata 164, 174. The computing device 102 may also be communicatively coupled to one or more computing devices 134 storing media content 182 and corresponding media metadata 184 via a local area network (LAN) 128, where the local computing device 134 may be connected to the network 118.

The computing device 102 may also be communicatively coupled to the various remote entities via a wireless connection such as, for example, a Bluetooth connection, an infrared connection, and wireless local area network (WLAN) or other wireless connection. In other implementations, the computing device 102 may be coupled by a wired connection such as, for example, an Ethernet cable.

Figure 2:
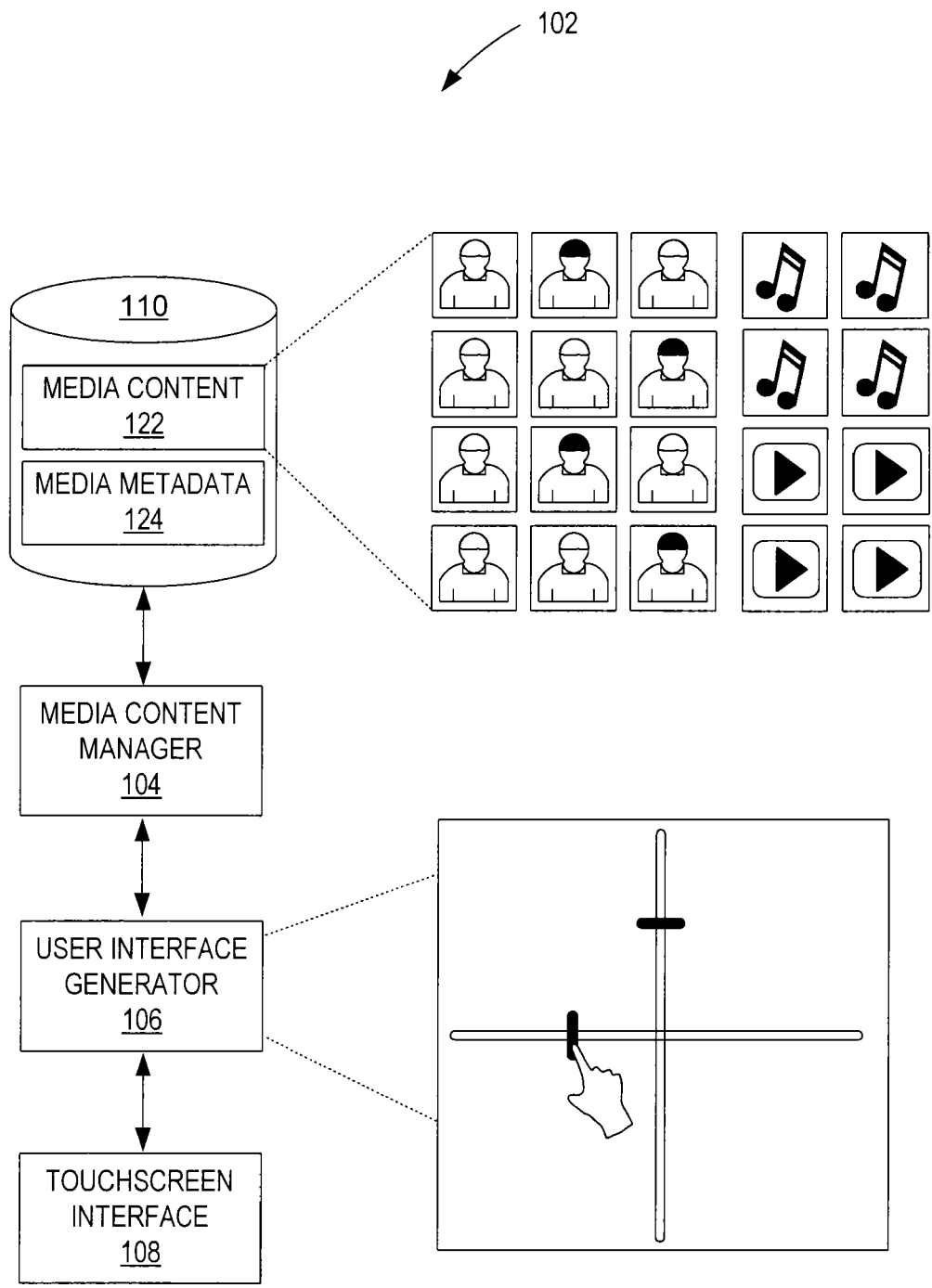
FIG. 2 illustrates the signal flow between various components of the user interface application executed in the computing device in FIG. 1.

FIG. 2 illustrates the high-level signal flow between various components in the computing device 102 shown in connection with FIG. 1. With reference to FIG. 2, the touchscreen interface 108 processes user input comprising, for example, touch gestures and communicates this to the media content manager 104. In operation, the media content manager 104 accesses the media content database 110 and retrieves media content 122 based on the user input. Note that the media content database 110 may contain media content 122 comprising, for example, digital images, audio files, and video files, where the media content 122 may have been captured directly by the computing device 102 and/or downloaded from another computing device.

As shown, the media content database 110 further stores metadata 124 associated with the media content 122. Note that a media "service" might analyze a user's content and generate additional metadata. For example, a user device might capture time or location while generating content, while a media service might post-process the content and "recognize" a location or may evaluate some other aspect of the content (fast\slow, new song\old song, etc.) The metadata 124 contains information relating to attributes or characteristics of the associated media content 122. Such information may comprise, for example, location tags (such as, but not limited to, geotags), string identifiers, tags comprising one or more keywords, classifiers, time/data stamps, genre, and other forms of information relating to the media content 122 that may be used, for example, for sorting purposes. Based on user input received via the touchscreen interface 108, the media content manager 104 generates a user interface comprising selection means and elements corresponding to media content 122. Through the customized user interface, the user is able to access media content 122.

Figure 3:
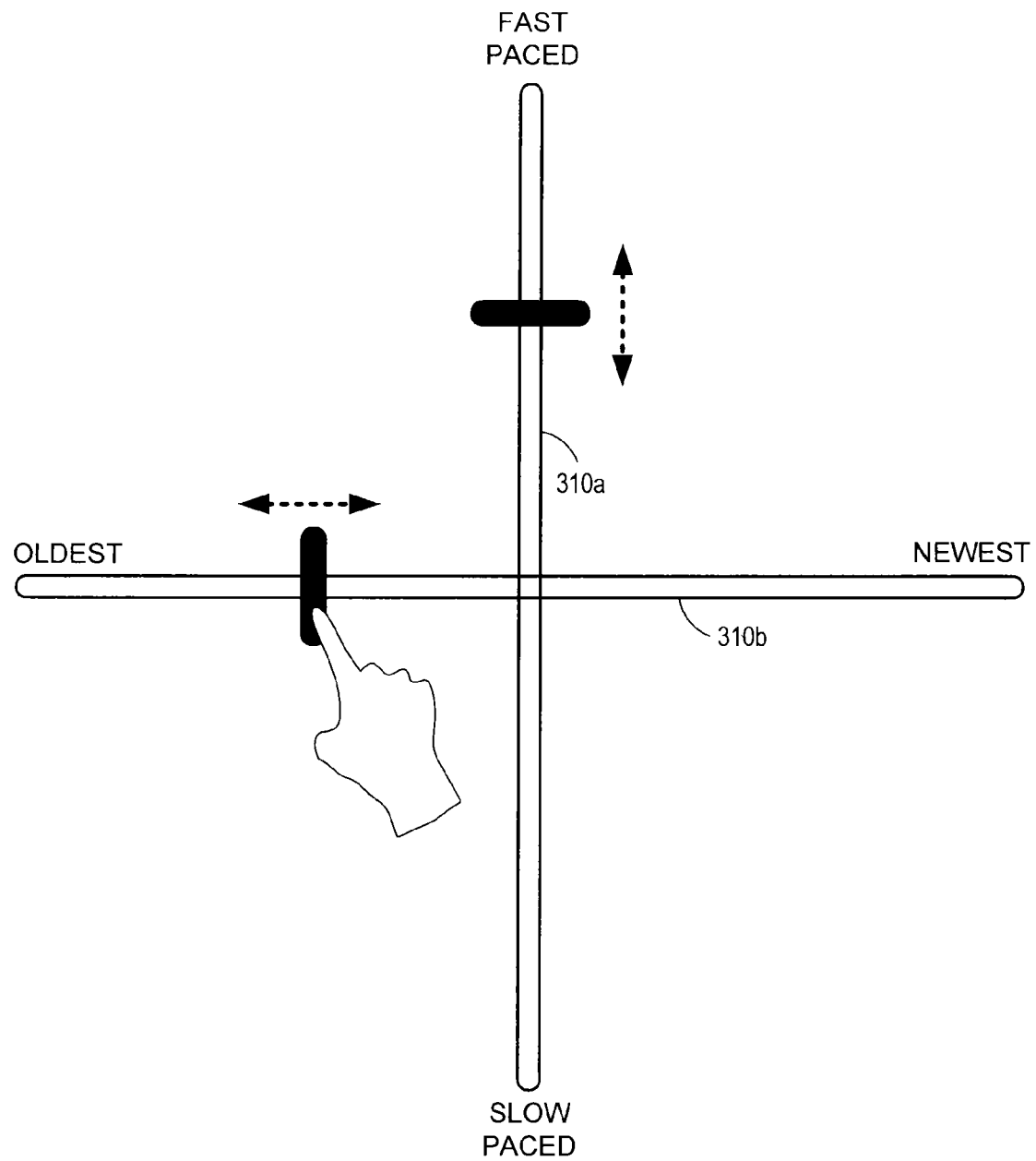
FIG. 3 depicts an example implementation whereby a user can customize a user interface for purposes of providing access to media content via touch gestures according to various embodiments of the present disclosure.

FIG. 3 depicts an example implementation of a user interface utilized for providing access to media content 122 (FIG. 1) via touch gestures. In accordance with various embodiments, selection means comprising, for example, one or more slider bar controls 310a, 310b are displayed as part of the user interface displayed on the touchscreen display of the computing device 102 (FIG. 1), where the slider bar controls 310a, 310b include lower and upper extreme values. In the example user interface shown, each slider control may represent an axis with end conditions where sliding one way leads to one extreme condition and sliding the other way leads to an alternative extreme condition. For example, sliding to one end may indicate preference for newest content and cause elements (e.g., thumbnail graphics, icons) corresponding to newest content to surface. Similarly, sliding to the other end may indicate preference for oldest content.

As another example, sliding to one end may indicate a preference for largest files while sliding to the other end may mean preference for smallest files. Other examples may include a preference for fast-paced music versus slow-paced music, pictures taken at locations nearest home versus pictures taken furthest away from home (or some geotagged reference point), etc. In the example user interface shown, these content relationships are defined in an X-Y dimension of the user interface and are implemented using multiple slider bar controls or other selection means. For example, a music library may be defined as oldest to newest in a left-to-right axis and may be defined as slowest to fastest in the bottom-to-top axis, as shown in the example user interface of FIG. 3.

Figure 4A:
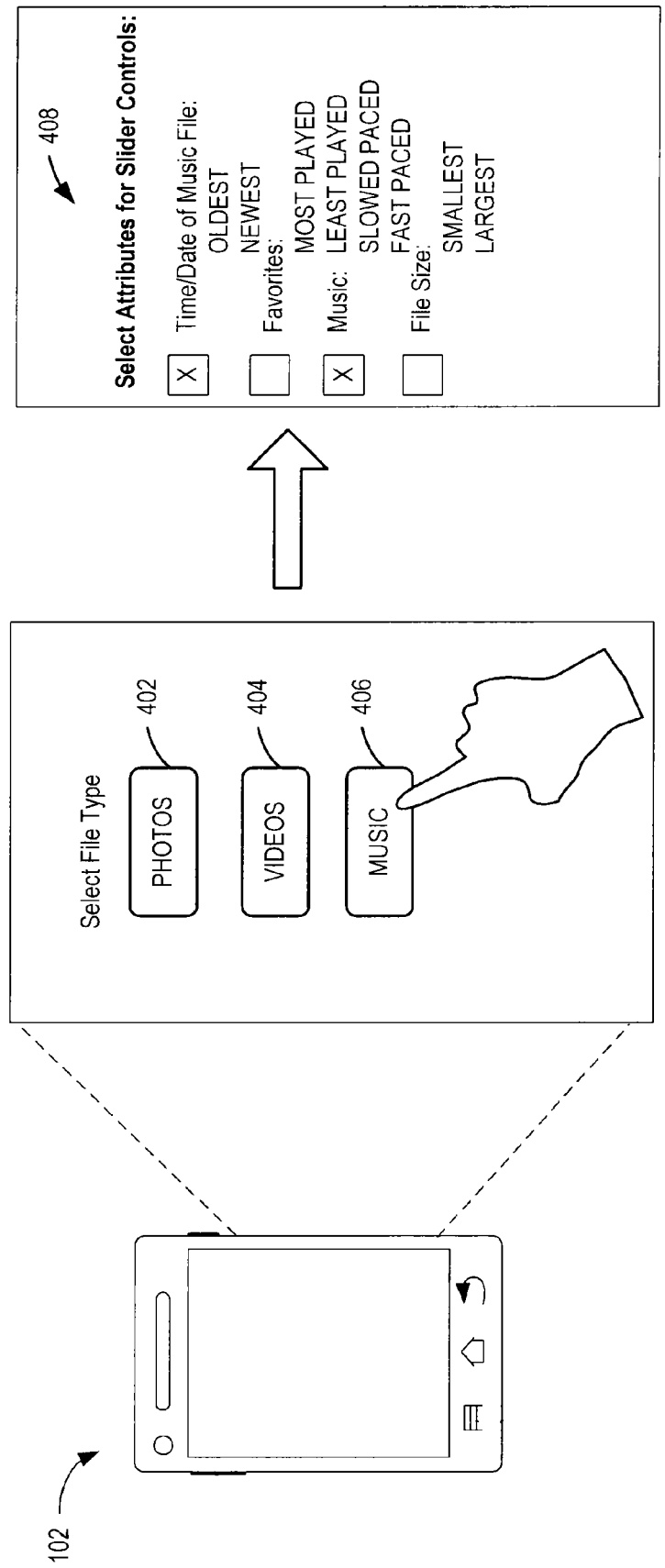
FIG. 4A is an example implementation in which users are able to customize the user interface by specifying the extreme values/conditions corresponding to the ends of the selection means according to various embodiments of the present disclosure.

Turning now to FIG. 4A, shown is an example implementation in which users are able to customize the user interface by specifying the attributes or extreme values/conditions corresponding to the ends of the selection means 310a, 310b (e.g., slider bar(s)) (FIG. 3). In accordance with some embodiments, the user first specifies a type of media content to be accessed by the customized user interface. In the example shown, the user can manipulate controls 402, 404, 406 corresponding to photos, music content, and video content.

Note, however, this is one possible implementation. As will be appreciated, different types of content may also be combined and accessed by the customized user interface. For example, if the user specifies that the content is to be sorted according to time/date and file size, the user may utilize the user interface to access all different types of media content (e.g., photos, videos, music). However, in other instances, the user may select an attribute or extreme value range that tends to be specific to a particular media type. For example, sorting according to the pace or beat of a song may be more appropriate for music files (but may also be applicable to videos), whereas sorting according to location data may be more appropriate for sorting and accessing photos. As shown, the user is presented with a series of selection components 408 (e.g., check boxes) for purposes of selecting one or more attributes/extreme value ranges.

Figure 4B:
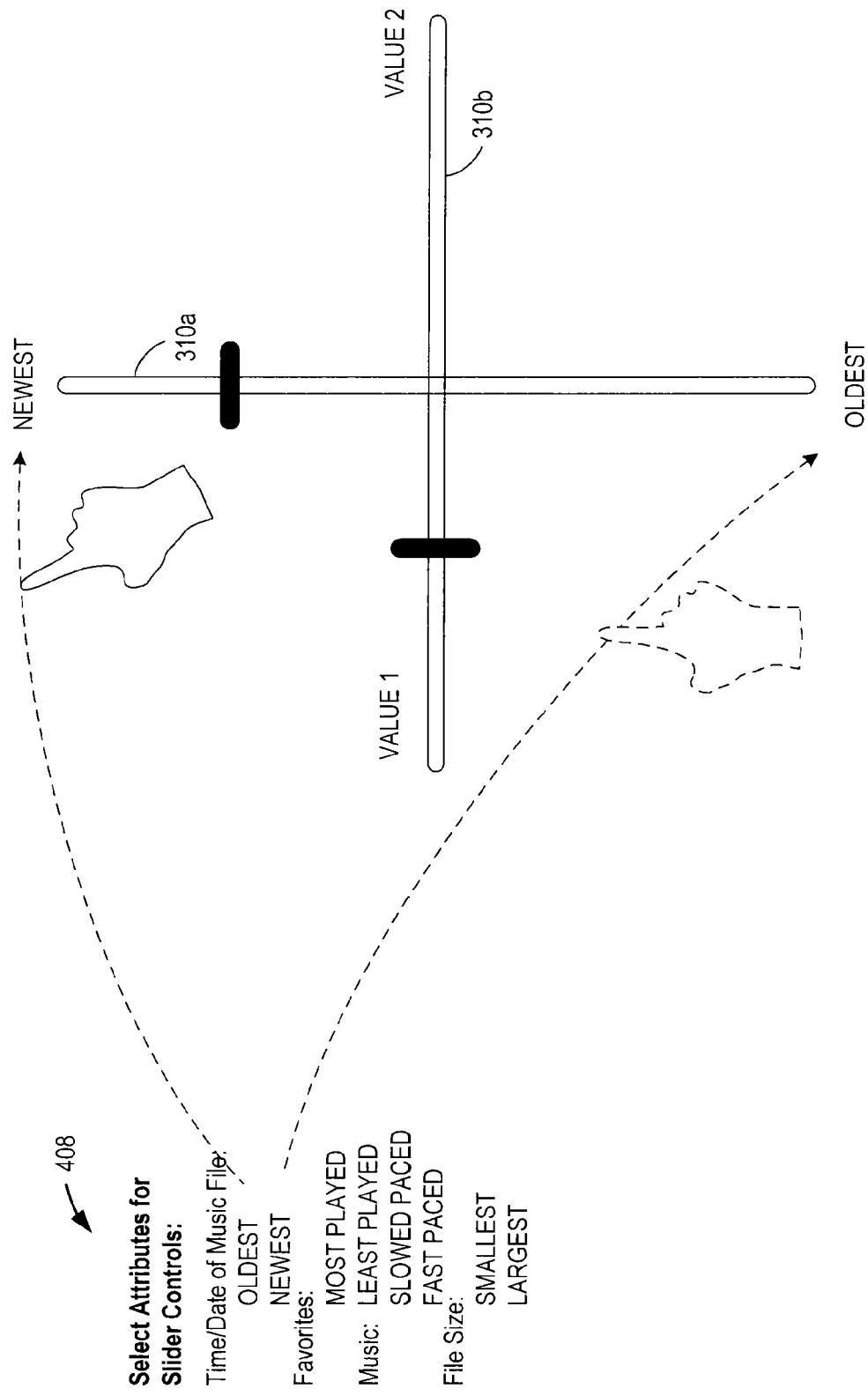
FIG. 4B is another example implementation in which users are able to customize the user interface by specifying the extreme values/conditions corresponding to the ends of the selection means according to various embodiments of the present disclosure.

Shown in FIG. 4B is another example implementation in which users may specify the attributes/extreme value ranges for the selection means 310a, 310b for purposes of sorting/organizing media content. As described earlier, some embodiments of the user interface may comprise content relationships defined in an X-Y dimension and are implemented using multiple slider bar controls or other selection means 310a, 310b. In the example shown, the user may simply drag extreme values/conditions to the corresponding ends of the selection means 310a, 310b. In this regard, users are therefore able to specify the location of the extreme values. For example, for the vertically-arranged selection means 310a shown, the top end corresponds to a preference for newest media content, while the bottom end corresponds to a preference for oldest media content. The user can later modify this by simply dragging the corresponding extreme value to the desired location.

Figure 5A:
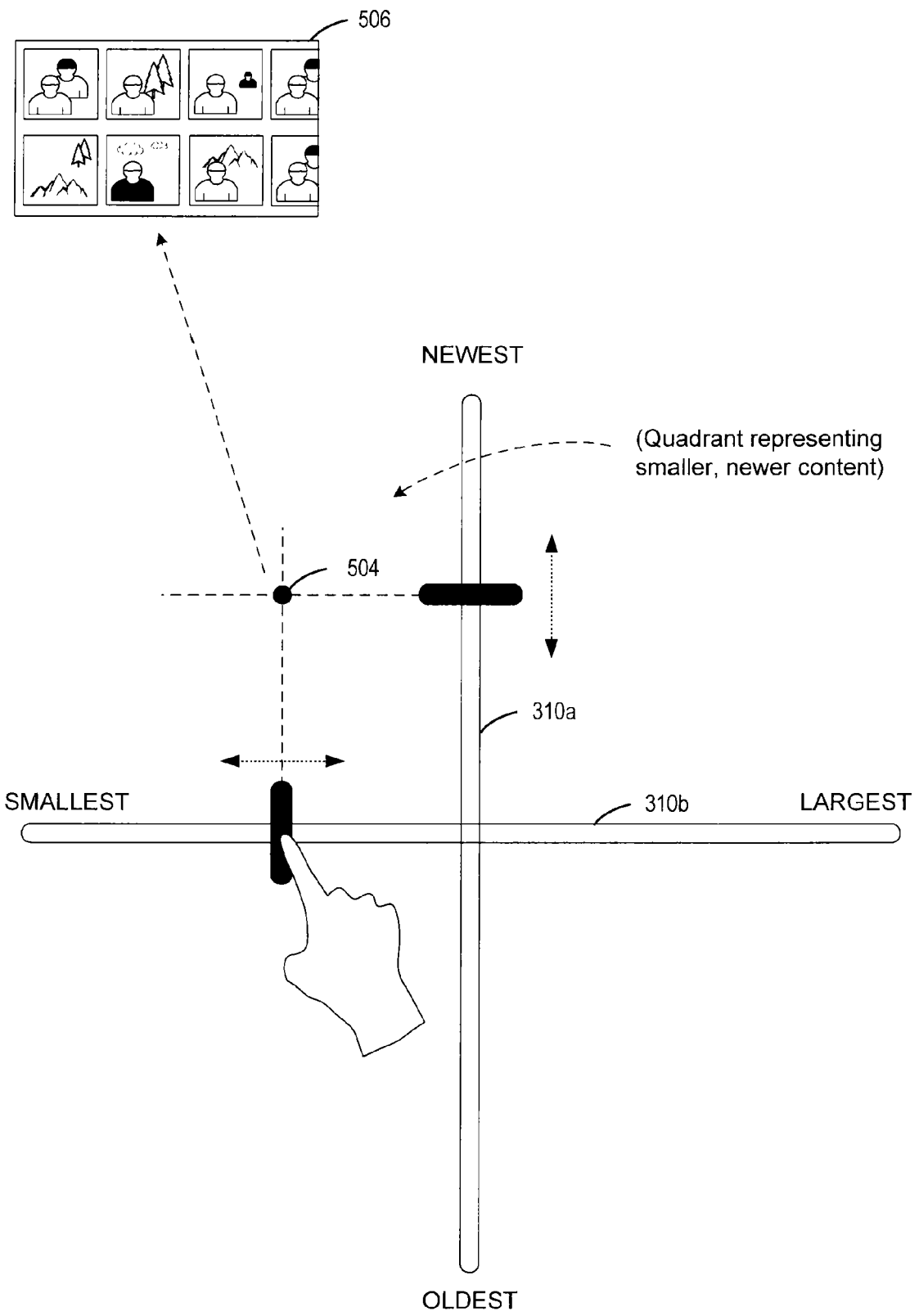
FIGS. 5A, 5B illustrate another aspect of an exemplary user interface where elements corresponding to media content are surfaced according to various embodiments of the present disclosure.

FIG. 5A illustrates another aspect of an exemplary user interface where elements corresponding to media content are surfaced. In the example shown, the user utilizes a series of touch gestures to adjust the selection means 310a, 310b for purposes of viewing and/or providing access to elements corresponding to media content. These elements may then be selected to retrieve the corresponding media content. In the example shown, an intersection point 504 of the selections corresponding to the two axes is shown. As shown, the positioning of the slider bars corresponds to a quadrant or user interface region representing smaller, newer content (e.g., photos). For some implementations, the user interface may further comprise a display window 506 for surfacing elements that correspond to the selected values in the user interface region/quadrant selected. In the example shown, the user has elected to view elements that are relatively newer and relatively smaller in file size with respect to other media content stored in the media content database 110 (FIG. 1).

Figure 5B:
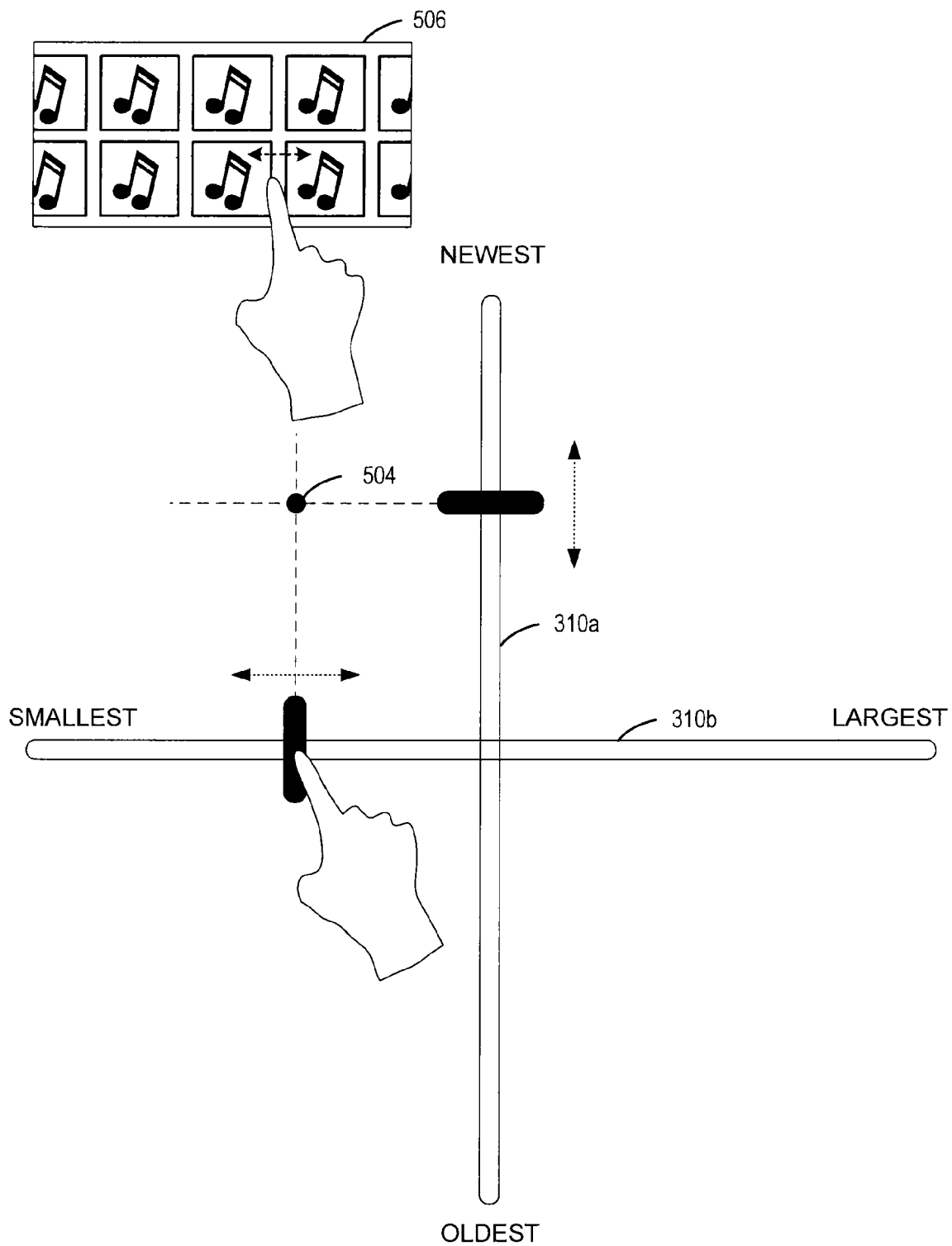

Based on the user-specified intersection point 504 received by the touchscreen interface 108 (FIG. 1), the media content manager 104 (FIG. 1) searches the media content 122 (FIG. 1) in the media content database 110 (FIG. 1) and examines the corresponding media metadata 124 (FIG. 1) to identify media content 122 that correspond to the intersection point 504. The elements shown in the display window 506 may comprise, for example, thumbnails, graphic icons, and so on that represent the media content corresponding to the intersection point. The arrangement of the elements shown in the display window 506 is an example, and other arrangements may be utilized. Furthermore, as illustrated in FIG. 5B, users may view additional elements by performing a swipe motion in the left or right direction to surface additional elements. For example, the slider bars may be manipulated to define an intersection point 504, thereby causing a display window 506 with one or more elements to be displayed. The user may then perform a swipe motion to the left or right directions to select new elements within the display window 506. Using the display window 506, the user can then access the media content by simply tapping on a corresponding element.

Figure 6:
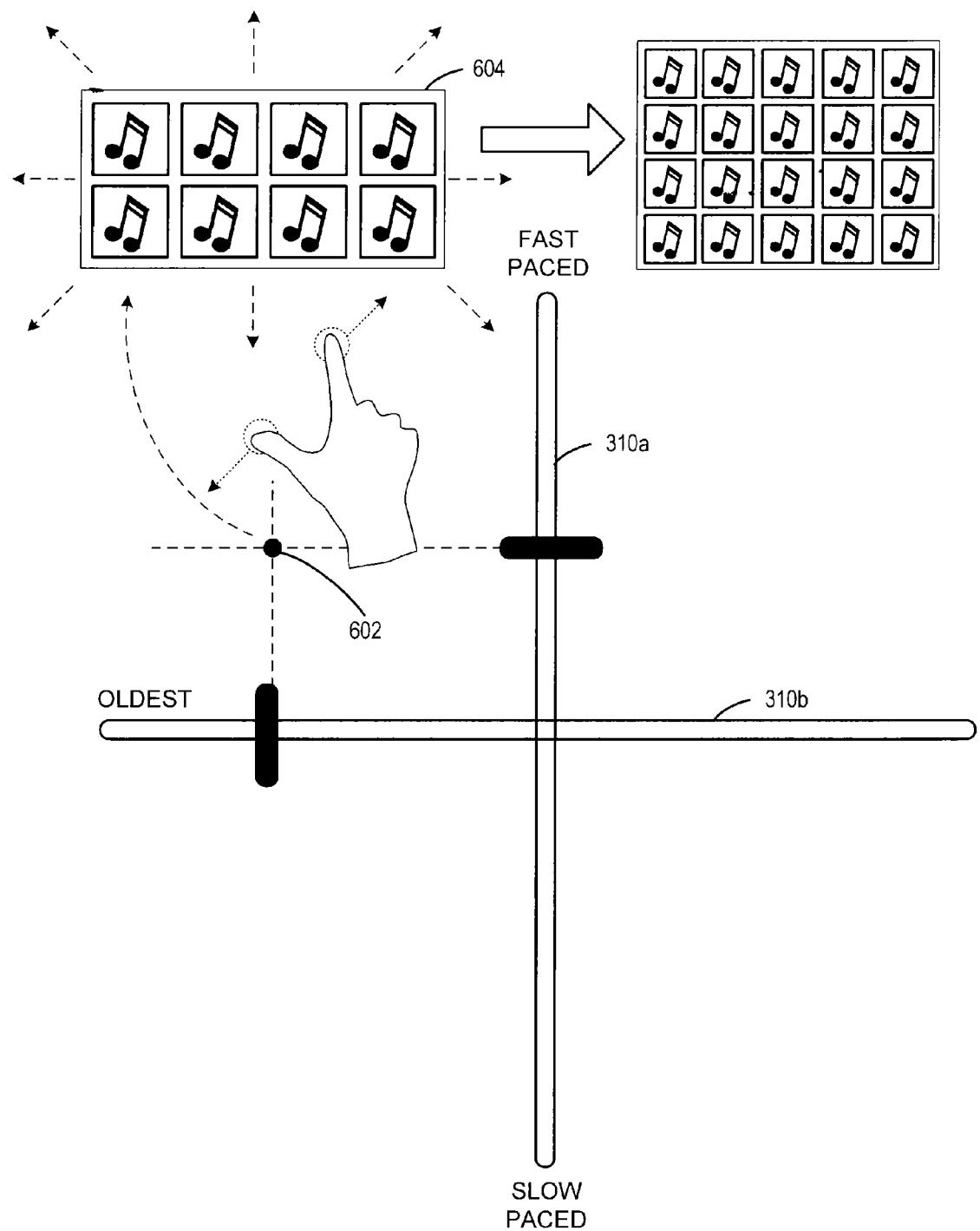
FIG. 6 illustrates another implementation of the user interface whereby users can surface additional elements by performing a pinch zoom touch gesture on the user interface according to various embodiments of the present disclosure.

FIG. 6 illustrates another implementation of the user interface whereby users can surface additional elements by performing a pinch zoom touch gesture on the user interface. In accordance with some embodiments, a pinch zoom touch gesture may comprise performing a narrowing or widening motion, whereby moving fingers together constitutes a "pinch" that narrows the range. On the other hand, moving the fingers apart (i.e., an inverse pinch) results in the range being widened. In accordance with some embodiments, users may expand the display window 604 to surface additional elements, where the elements correspond to the specified intersection point 602 in the region of interest formed by the two axes.

In the illustration shown, the pinch zoom touch gesture results in additional elements corresponding to older, fast-paced music relative to other music stored in the media content database 110 (FIG. 1) being surfaced. That is, by moving the fingers in an inverse pinch, the use is widening the range of viewable old\fast paced music (more titles appear). In the user interface shown, the user can perform a pinch zoom touch gesture anywhere in the user interface as the intersection point 602 is defined by the position of the slider bars.

Figure 7:
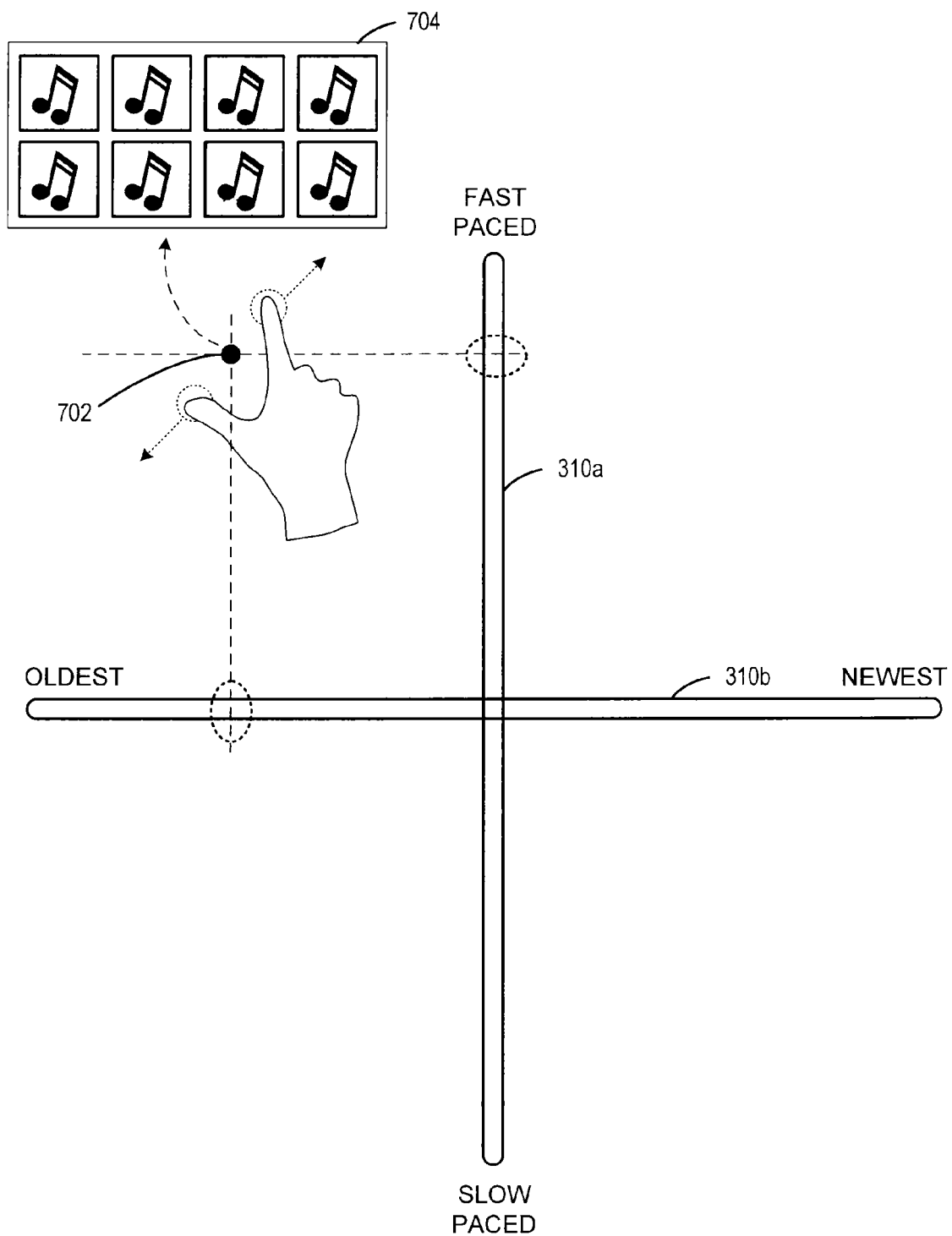
FIG. 7 illustrates another embodiment of a user interface whereby the location of the user's touch gesture defines an intersection point corresponding to the user's preference according to various embodiments of the present disclosure.

FIG. 7 illustrates another embodiment of a user interface whereby the location of the user's touch gesture defines the intersection point 702 corresponding to the user's preference. For some embodiments, the user performs a touch gesture such as a pinch zoom touch gesture in one of the user interface regions or quadrants defined by the selection means 310a, 310b. As shown, the starting location of the pinch zoom touch gesture occurs at an intersection point 702 corresponding to relatively older, fast-paced music elements, which are shown in the display window 704.

Figure 8:
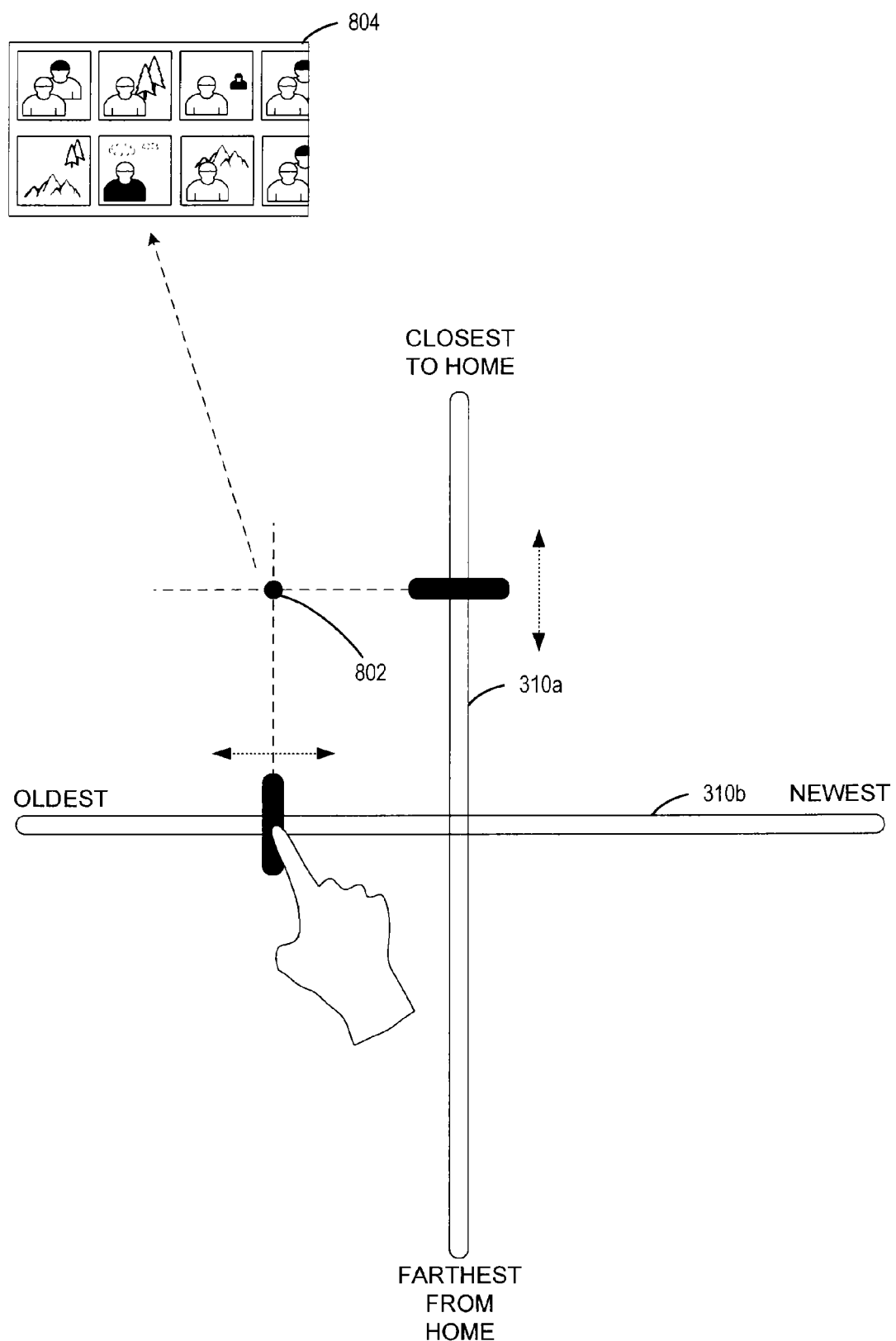
FIG. 8 illustrates another example of a user interface, whereby digital photos are sorted and accessed using selection means arranged according to a left-to-right axis and a bottom-to-top axis according to various embodiments of the present disclosure.

FIG. 8 illustrates another example of a user interface, whereby digital photos are sorted and accessed using selection means 310a, 310b arranged according to a left-to-right axis and a bottom-to-top axis. As discussed above, the user may define dimensions of interest by specifying the extreme values corresponding to the axes and then zoom or spread about an intersection point 802 to surface additional elements. In the illustration shown, the user interface is utilized to sort and access digital photos, where one dimension of interest spans from oldest photos to newest photos stored in the media content database 110 (FIG. 1), and where the other dimension of interest spans photos taken at locations farthest from a reference location (i.e., home) to photos taken at locations closest to the reference location.

In the preceding examples, the user interface is defined by different rotated axes, where axes are selected and selection means 310a, 310b such as slider bars are manipulated to specify preferences for elements to surface. Users may then perform pinch zoom or other touch gestures to select a desired aspect range. Thus, in operation, this range may act as a "filter" function. In the examples described, a user has selected an intersection point 802 representing an approximate area of interest on one axis (by slider or possibly rotation and slider) and then has selected a certain amount of uncertainty or "width" of information about this slider selected point.

Figure 9:
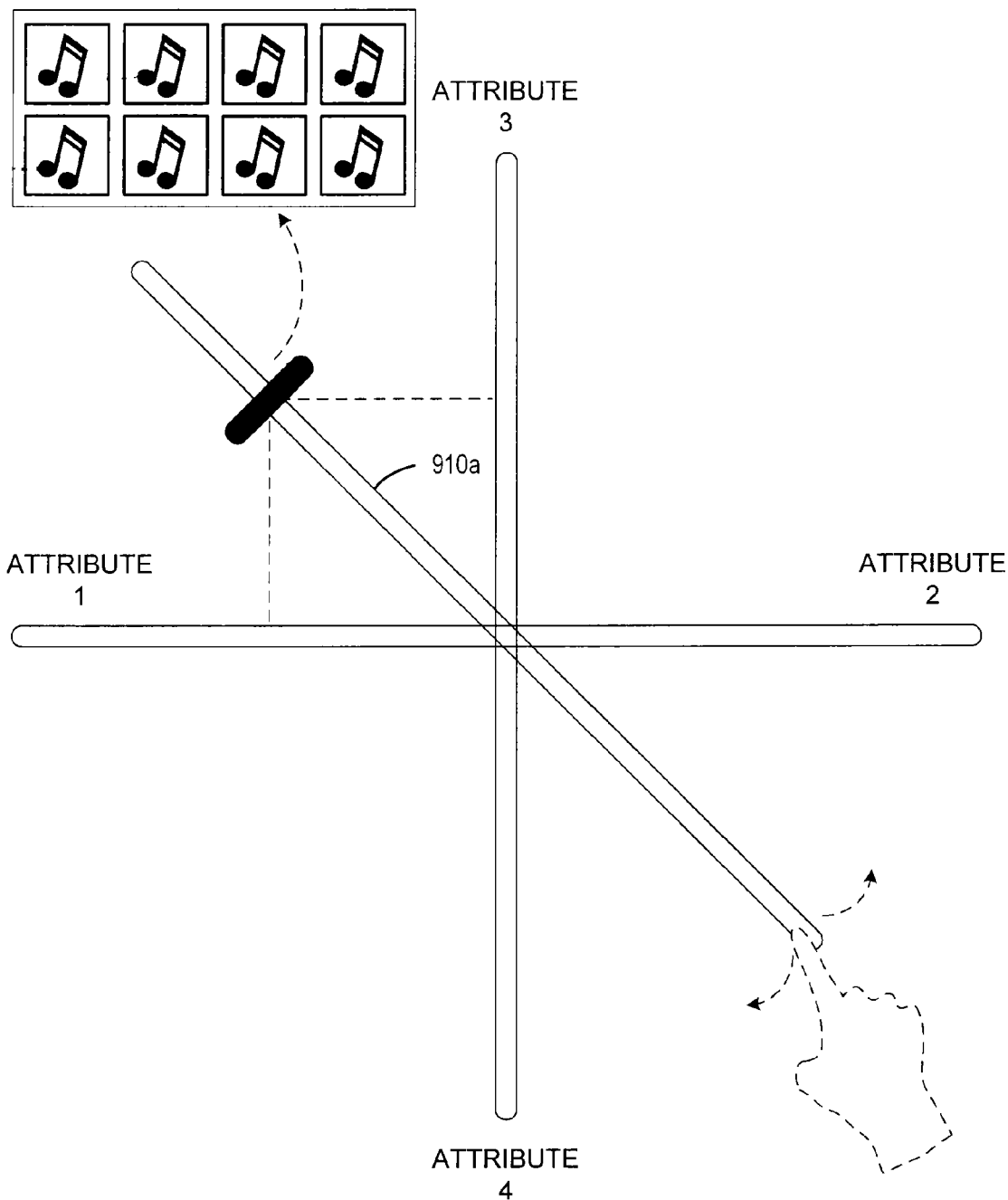
FIG. 9 is an embodiment of a user interface where users rotate an intermediate axes formed by a selection means and manipulate the selection means to specify a preference according to various embodiments of the present disclosure.

For some implementations, the rotation axes may be discrete where each axis in the rotation has a unique attribute/extreme value range. However, the rotation axes may also be continuous where a given rotation point has an attribute related to and is a combination of the attribute of the nearest axes. Shown in FIG. 9 is an embodiment of a user interface where users rotate an intermediate axes formed by a selection means 910a and then manipulate the selection means 910a to specify a preference. In the example shown, the user has selected a preference in the user interface quadrant corresponding to Attribute 1 and Attribute 3.

Figure 10:
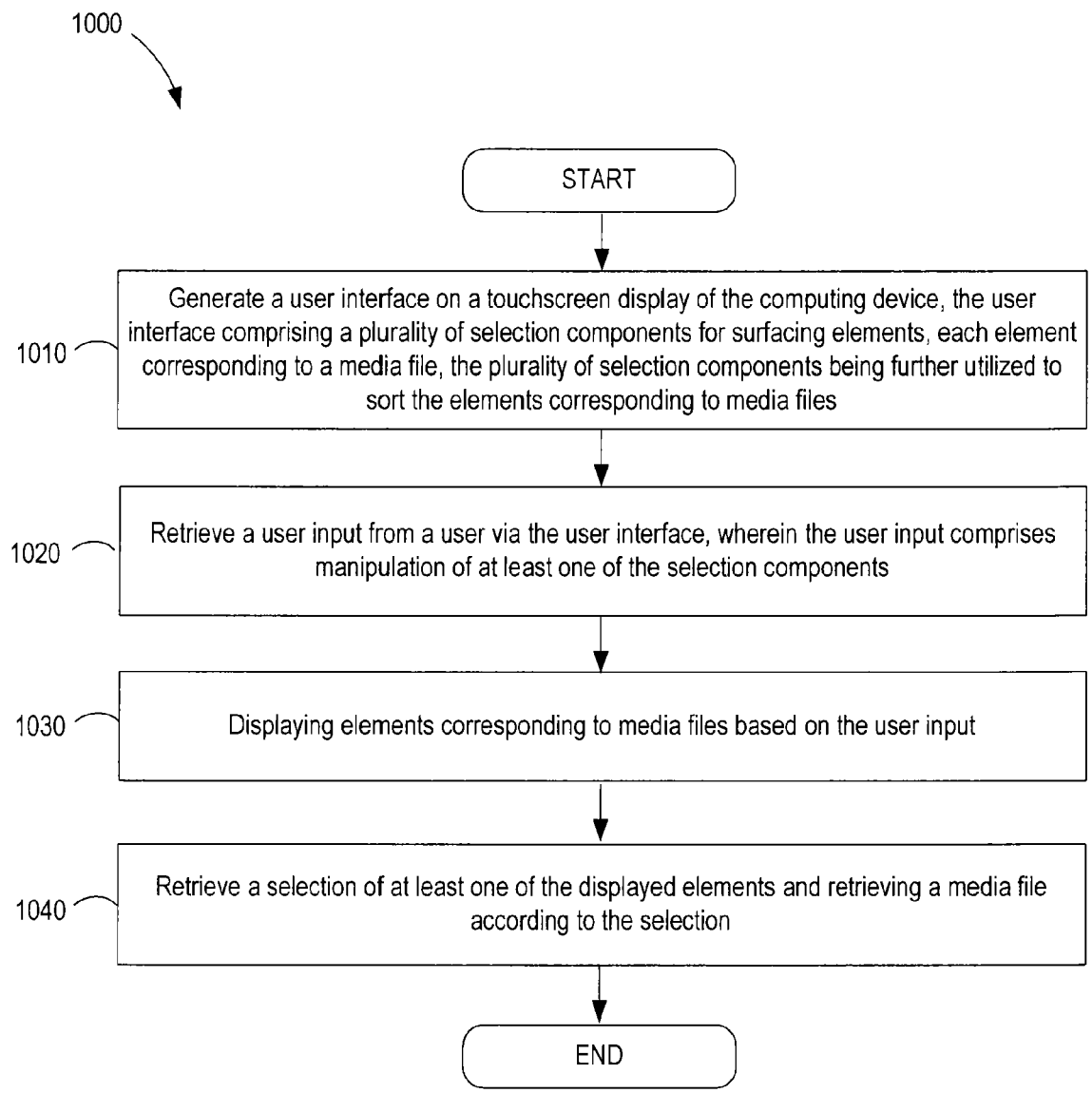
FIG. 10 is a top-level flowchart illustrating examples of functionality implemented as portions of the user interface application executing in the computing device in FIG. 1 for providing access to media content according to various embodiments of the present disclosure.

Reference is made to FIG. 10, which is a flowchart 1000 in accordance with one embodiment for providing access to media content performed by the user interface application 101 (FIG. 1) executed in the computing device 102 (FIG. 1). It is understood that the flowchart 1000 of FIG. 10 provides merely an example of the many different types of functional arrangements that may be employed. As an alternative, the flowchart of FIG. 10 may be viewed as depicting an example of steps of a method implemented via execution of the user interface application 101 in the computing device 102 according to one or more embodiments.

In accordance with one embodiment for providing access to media content, the user interface application 101 executing in the computing device 102 begins with block 1010 and generates a user interface on a touchscreen display of the computing device 102. In accordance with some embodiments, the user interface comprises a plurality of selection components for surfacing elements, where each element corresponds to a media file. The plurality of selection components are utilized to sort the elements corresponding to media files. The selection components may comprise such selection means 310a, 310b (FIG. 3) as slider bars or other components.

In block 1020, the user interface application 101 retrieves a user input from a user via the user interface, where the user input comprises manipulation of at least one of the selection components. To illustrate, reference is made briefly back to FIG. 3 where, as described earlier, users may move the slider bar to specify a preference for purposes of surfacing elements corresponding to media content.

Referring back to FIG. 10, in block 1030, the user interface application 101 displays elements corresponding to media files based on the user input, and in block 1040, a selection of at least one of the displayed elements is retrieved, and a media file is retrieved according to the selection.

Figure 11:
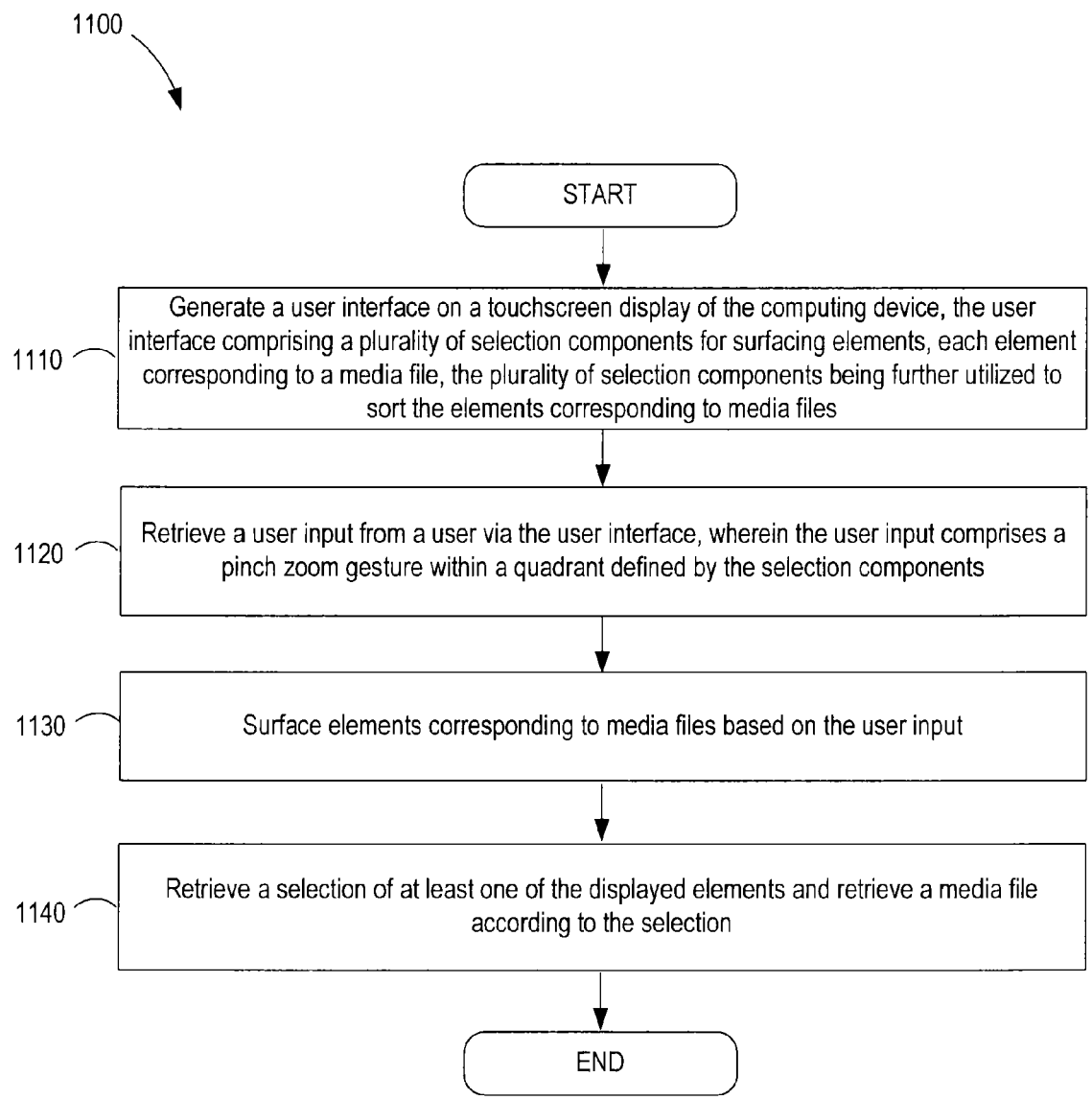
FIG. 11 is a top-level flowchart illustrating other examples of functionality implemented as portions of the user interface application executing in the computing device in FIG. 1 for providing access to media content according to various embodiments of the present disclosure.

Reference is made to FIG. 11, which is a flowchart 1100 in accordance with an alternative embodiment for providing access to media content performed by the user interface application service 101 (FIG. 1) executed in the computing device 102 (FIG. 1). Again, it is understood that the flowchart 1100 of FIG. 11 provides merely an example of the many different types of functional arrangements that may be employed. As an alternative, the flowchart of FIG. 11 may be viewed as depicting an example of steps of a method implemented via execution of the user interface application 101 in the computing device 102 according to one or more embodiments.

In accordance with an alternative embodiment for providing access to media content, the user interface application 101 executing in the computing device 102 begins with block 1110 and generates a user interface on a touchscreen display of the computing device 102. In accordance with such embodiments, the user interface comprises a plurality of selection components for surfacing elements, where each element corresponds to a media file, and where the plurality of selection components are utilized to sort the elements corresponding to media files.

In block 1120, the user interface application 101 retrieves user input via the user interface, where the user input comprises a pinch zoom gesture within a quadrant defined by the selection components.

In block 1130, the user interface application 101 surfaces elements corresponding to media files based on the user input. In block 1140, the user interface application retrieves a selection of at least one of the displayed elements and retrieves a media file according to the selection.

Figure 12:
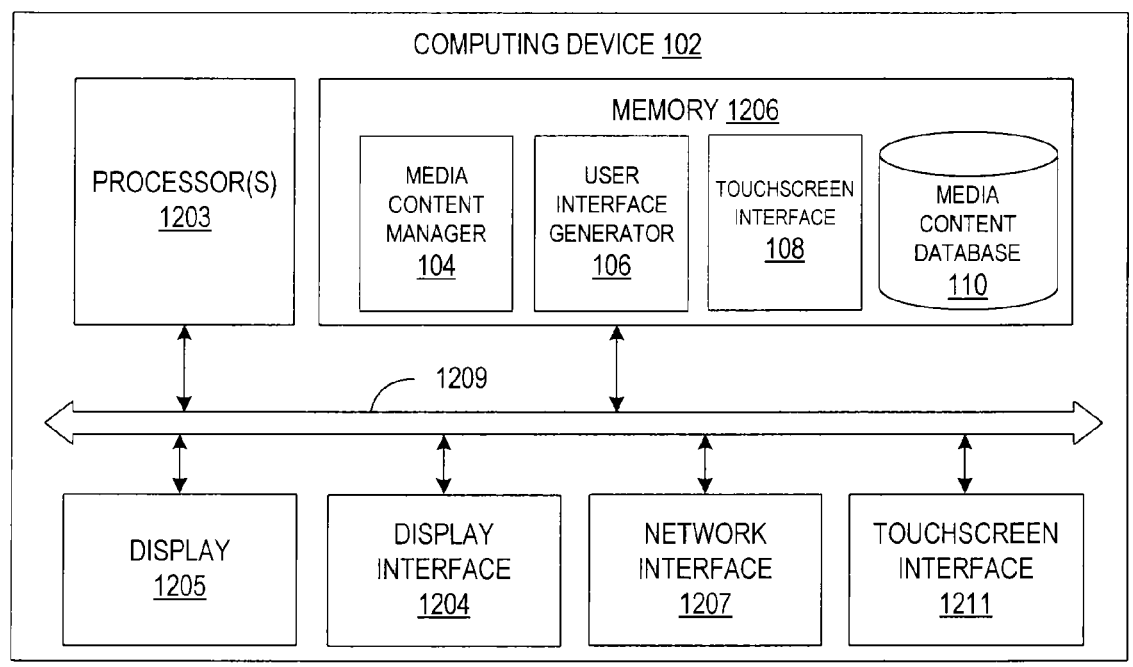
FIG. 12 is a schematic block diagram of the computing device in FIG. 1 according to an embodiment of the present disclosure.

With reference to FIG. 12, shown is a schematic block diagram of the computing device 102 according to an embodiment of the present disclosure. The computing device 102 includes at least one processor 1203, a memory 1206, and a display interface 1204, all of which are coupled to a local interface 1209. The computing device 102 may further comprise a display 1205 and a network interface 1207. The network interface 1207 comprises various components used to transmit and/or receive data over a network environment. By way of example, the network interface 1207 may include a device that can communicate with both inputs and outputs, for instance, a modulator/demodulator (e.g., a modem), wireless (e.g., radio frequency (RF)) transceiver, a telephonic interface, network card, etc.) capable of supporting, for example, wide area network (WAN), local area network (LAN) communications.

For some embodiments, the computing device may also include a touchscreen interface 1211, where the touchscreen interface 1211 is configured to detect contact within the display area of the display 1205 and provides such functionality as on-screen buttons, menus, keyboards, etc. that allow users to navigate user interfaces by touch. In this regard, the computing device 102 may comprise, for example, at least one computer or like device. The local interface 1209 may comprise, for example, a data bus with an accompanying address/control bus or other bus structure as can be appreciated.

Stored in the memory 1206 are both data and several components that are executable by the processor 1203. In particular, stored in the memory 1206 and executable by the processor 1203 are the various components of the user interface application 101 (FIG. 1) including the media content manager 104, user interface generator 106, the touchscreen interface 108, and potentially other applications. Also stored in the memory 1206 may be the media content database 110 and other data. In addition, an operating system may be stored in the memory 1206 and executable by the processor 1203.

It is understood that there may be other applications that are stored in the memory 1206 and are executable by the processor 1203 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memory 1206 and are executable by the processor 1203. In this respect, the term "executable" means a program file that is in a form that can ultimately be run by the processor 1203. Examples of executable programs may be, for example, a compiled program that can be translated into machine code in a format that can be loaded into a random access portion of the memory 1206 and run by the processor 1203, source code that may be expressed in proper format such as object code that is capable of being loaded into a random access portion of the memory 1206 and executed by the processor 1203, or source code that may be interpreted by another executable program to generate instructions in a random access portion of the memory 1206 to be executed by the processor 1203, etc.

An executable program may be stored in any portion or component of the memory 1206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1206 is defined herein as including both volatile and nonvolatile memory and data storage components. Volatile components are those that do not retain data values upon loss of power. Nonvolatile components are those that retain data upon a loss of power. Thus, the memory 1206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components.

In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1203 may represent multiple processors 1203 and the memory 1206 may represent multiple memories 1206 that operate in parallel processing circuits, respectively. In such a case, the local interface 1209 may be an appropriate network that facilitates communication between any two of the multiple processors 1203, between any processor 1203 and any of the memories 1206, or between any two of the memories 1206, etc. The local interface 1209 may comprise additional systems designed to coordinate this communication, including, for example, performing load balancing. The processor 1203 may be of electrical or of some other available construction.

Although the media content manager 104, the user interface generator 106, the touchscreen interface 108, and other various components described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 10 and 11 show examples of functionality of an implementation of portions of the user interface application 101. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1203 in a computer system or other system. The machine code may be converted from the source code, etc. If embodied in hardware, each block may represent a circuit or a number of interconnected circuits to implement the specified logical function(s).

Although the flowcharts herein show a specific order of execution, it is understood that the order of execution may differ from that which is depicted. For example, the order of execution of two or more blocks may be scrambled relative to the order shown. Also, two or more blocks shown in succession in the flowcharts may be executed concurrently or with partial concurrence. Further, in some embodiments, one or more of the blocks shown in the flowcharts may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the media content manager 104, the user interface generator 106, the touchscreen interface 108, that comprises software or code can be embodied in any non-transitory computer-readable medium for use by or in connection with an instruction execution system such as, for example, a processor in a computer system or other system. In this sense, each may comprise, for example, statements including instructions and declarations that can be fetched from the computer-readable medium and executed by the instruction execution system.

Figure 13A:
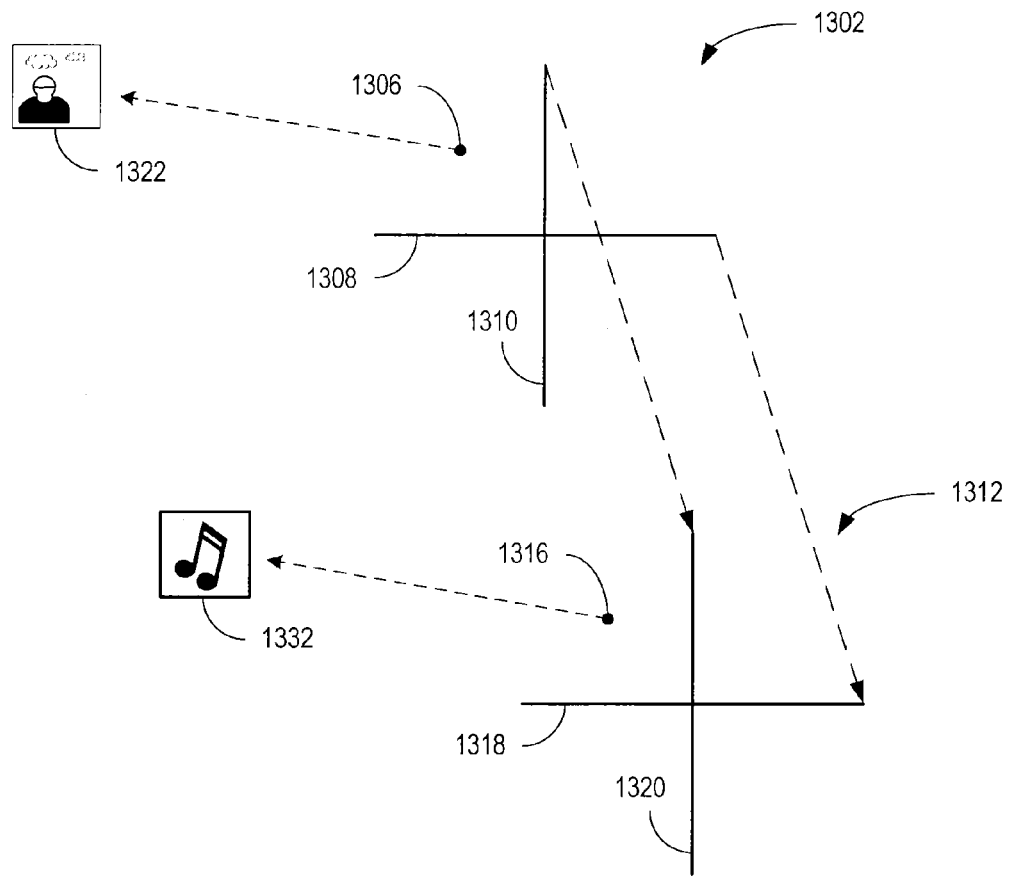
FIGS. 13A, 13B illustrate another aspect of an exemplary user interface where elements corresponding to media content are surfaced according to various embodiments of the present disclosure.
Figure 13B:
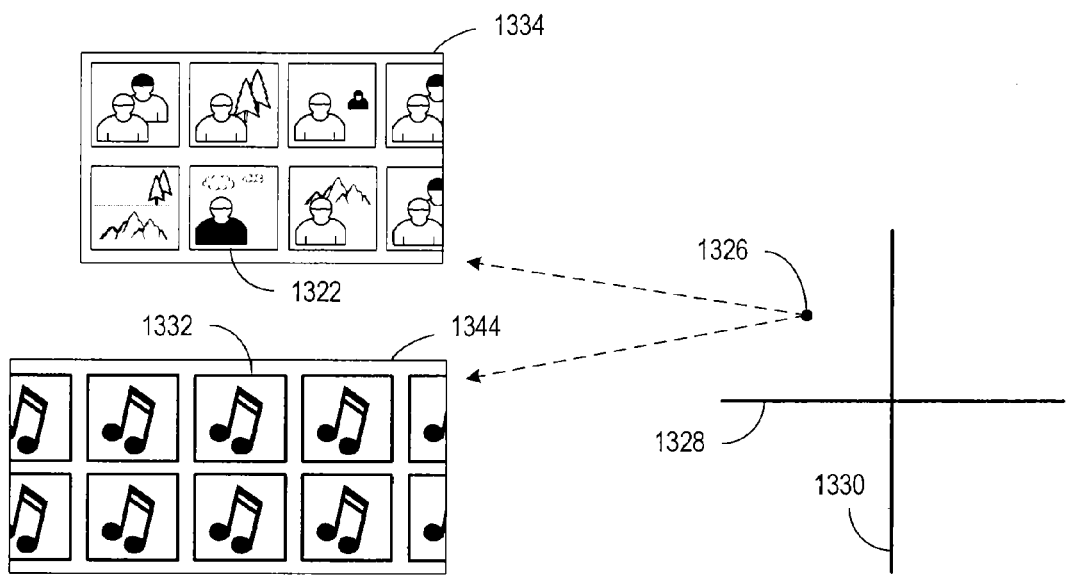

FIGS. 13A, 13B illustrate another aspect of an exemplary user interface in which elements corresponding to media content are surfaced. In particular, in FIG. 13A, two sets of selection components 1302, 1312 are depicted. Notably, each of the selection components includes axes that define a corresponding portion of a user interface for viewing and/or providing access to elements corresponding to media content via touch gestures. In this example, selection components 1302 are associated with a first set of elements (e.g., element 1322), and selection components 1312 are associated with a second set of elements (e.g., element 1332). These elements may then be selected to retrieve the corresponding media content.

In the example shown, an intersection point 1306 of the selections corresponding to the axes 1308, 1310 and an intersection point 1316 of the selections corresponding to the axes 1318, 1320 are shown. Notably, intersection point 1306 corresponds to element 1322 and intersection point 1316 corresponds to element 1332. In some embodiments, slider bar controls (not shown in FIGS. 13A, 13B) may be used to facilitate identification of an intersection point.

In FIG. 13B, the selection components are arranged so that at least a portion of one of the selection components is in an overlying relationship with the other. In this case, the selection components are arranged so that the corresponding axes are coextensive. That is, axes 1308 and 1318 are aligned (identified in FIG. 13B as combined axis 1328) and axes 1310 and 1320 are aligned (identified in FIG. 13B as combined axis 1330). A combination sort is applied to the associated media content based on the spacial relationship between the selection components. As such, a combined intersection point 1326 corresponds to media content associated with both of selection components 1302 and 1312. Specifically, intersection point 1326 corresponds to elements 1322 and 1332.

Based on the user-specified intersection point 1326 received by the touchscreen interface, a media content manager searches media content in a media content database and examines the corresponding media metadata to identify media content that correspond to the intersection point. In this embodiment, the elements are shown in display windows (e.g., windows 1334, 1344).

Figure 14A:
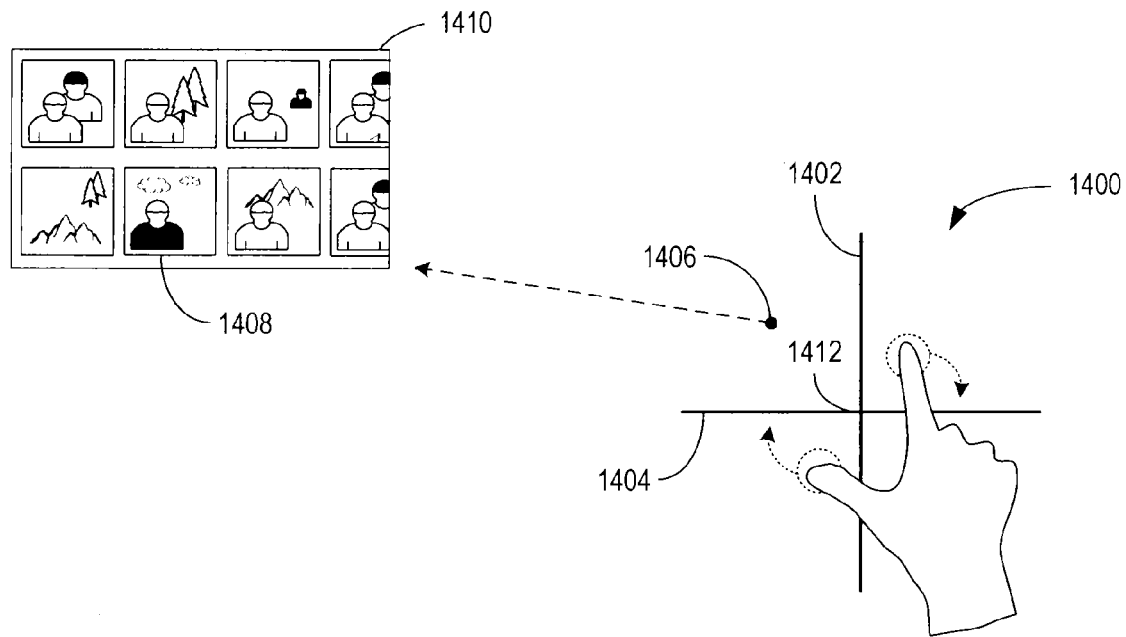
FIGS. 14A, 14B illustrate another aspect of an exemplary user interface where elements corresponding to media content are surfaced according to various embodiments of the present disclosure.
Figure 14B:
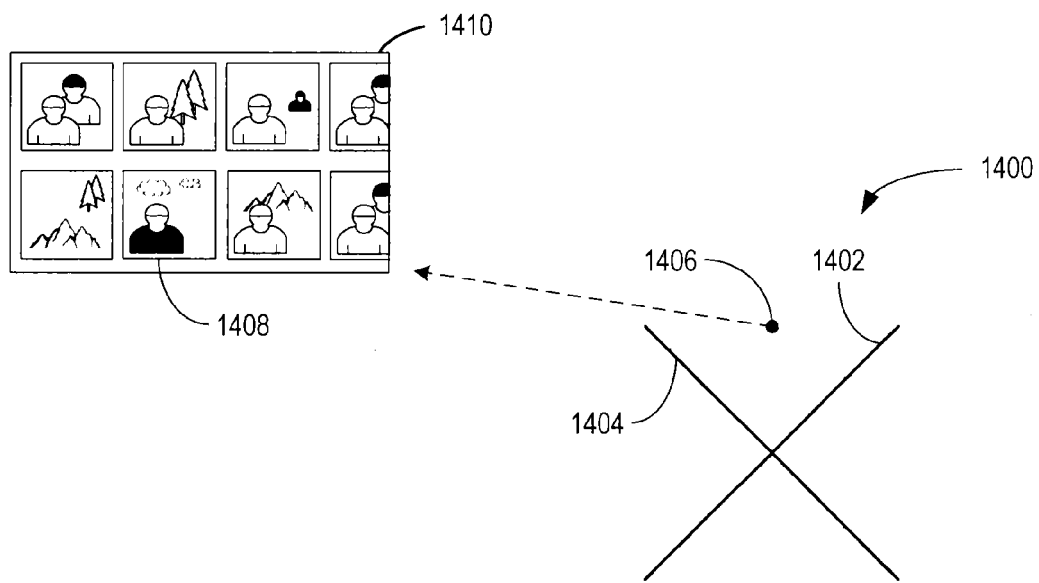

FIGS. 14A, 14B illustrate another aspect of an exemplary user interface in which elements corresponding to media content are surfaced. As shown in FIG. 14A, selection components 1400 include an axis 1402 in a substantially vertical orientation and axis 1404 in a substantially horizontal orientation. An intersection point 1406 also is depicted that corresponds to an element 1408, which is displayed in a window 1410.

Responsive to user input corresponding to a multi-finger rotation gesture (represented in FIG. 14A by the dashed and curved arrows), the orientation of selection components 1400 is altered. Specifically, responsive to the clockwise rotation of the user input, the selection components are rotated clockwise about pivot 1412, which corresponds to the intersection of axes 1402, 1404. Although the extent of rotation may vary, the user input in this case results in a rotation of approximately 45 degrees as shown in FIG. 14B. Note also that intersection point 1406 has rotated along with the axes.

Figure 15A:
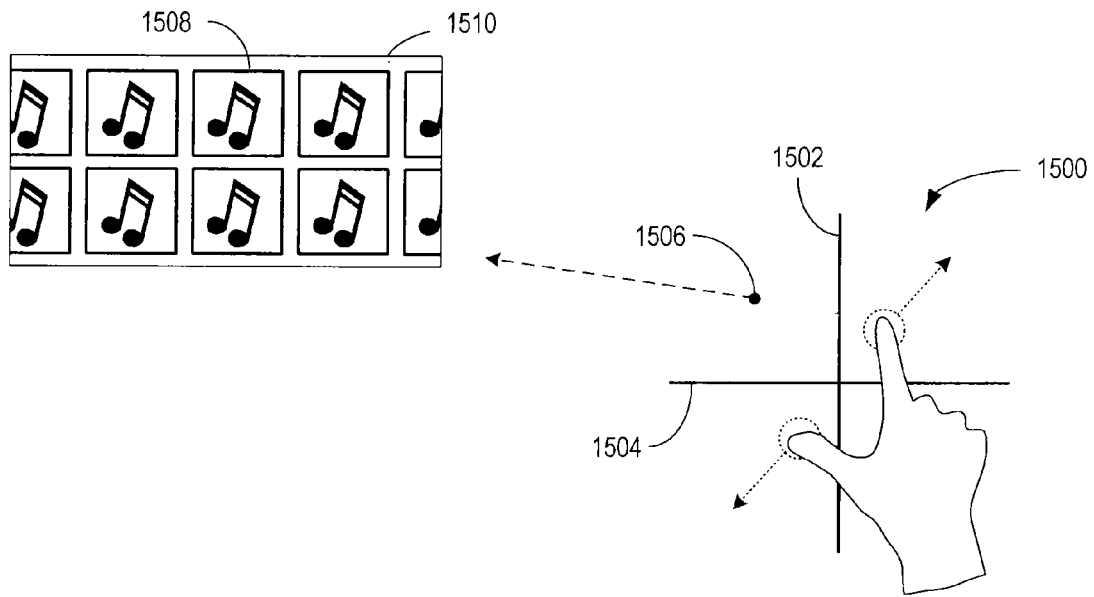
FIGS. 15A, 15B illustrate another aspect of an exemplary user interface where elements corresponding to media content are surfaced according to various embodiments of the present disclosure.
Figure 15B:
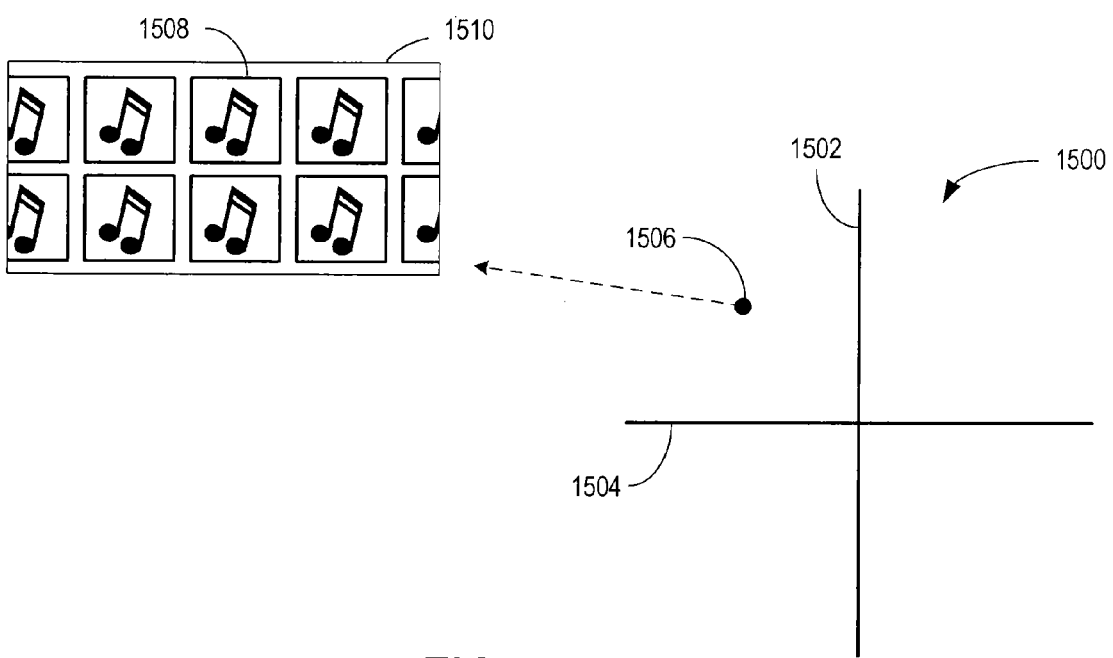

FIGS. 15A, 15B illustrate another aspect of an exemplary user interface in which elements corresponding to media content are surfaced. As shown in FIG. 15A, selection components 1500 include an axis 1502 in a substantially vertical orientation and axis 1504 in a substantially horizontal orientation. An intersection point 1506 also is depicted that corresponds to an element 1508, which is displayed in a window 1510.

Responsive to user input corresponding to a pinch zoom gesture (also shown in FIG. 15A), the size of selection components 1500 is altered. Specifically, responsive to the outwardly expanding movement of the user input, the selection components are increased in size. Although the extent of size change may vary, the user input in this case results in an increase in size of approximately 30% as shown in FIG. 15B. Note also that intersection point 1506 has maintained its positional relationship with respect to the axes.

Figure 16:
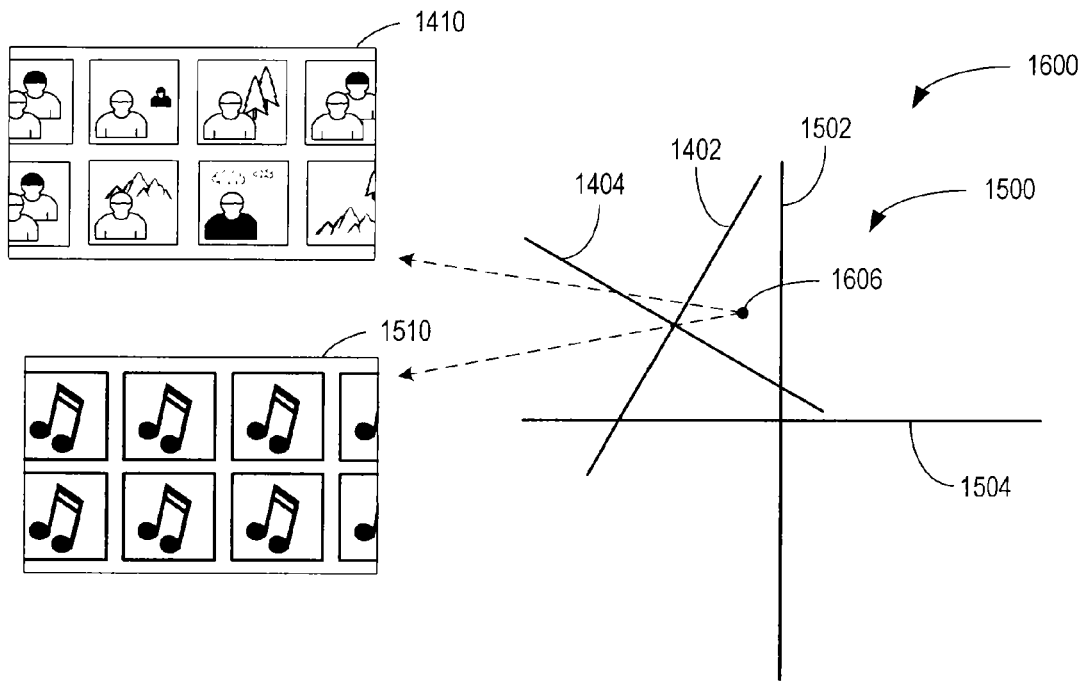
FIG. 16 is an embodiment of a user interface with which a user has resized and rotated first selection components and arranged the first selection components in an overlying relationship with second selection components according to various embodiments of the present disclosure.

FIG. 16 is an embodiment of a user interface with which a user has resized and rotated selection components and arranged a first of the selection components in an overlying relationship with a second of the selection components. In particular, FIG. 16 depicts a user interface in which selection components 1400 of FIGS. 14A, 14B and selection components 1500 of FIGS. 15A, 15B have been combined to form combined selection components 1500. Notably, the reference to an "overlying relationship" denotes portions of each of the selection components occupying the same physical space on the display; however, neither is actually "over" the other in a true physical sense although such an appearance may be graphically represented.

A combination sort is then accomplished so that by designating a single location on the interface (e.g., location 1606) media data associated with both of the selection components is accessed. In this example, media data associated with selection components 1400 is displayed in window 1410 and media data associated with selection components 1500 is displayed in window 1510.

In some embodiments, a result of a combination sort may include associating multiple content items such that the associated content items may be accessed simultaneously. By way of example, when an item of image content and an item of audio content are associated, when viewing the image content, the end user may also hear the audio content.

Figure 17:
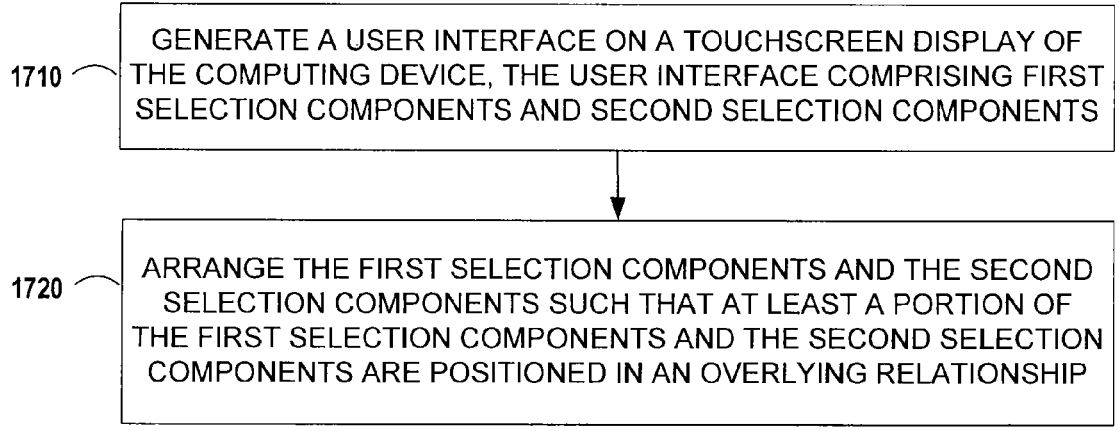
FIG. 17 is a top-level flowchart illustrating examples of functionality implemented as by a user interface application executing in a computing device according to various embodiments of the present disclosure.

FIG. 17 is a top-level flowchart illustrating examples of functionality implemented as by a user interface application executing in a computing device according to various embodiments of the present disclosure. As shown in FIG. 17, in block 1710, a user interface is generated on a touchscreen display of a computing device. For example, the user interface may include first selection components for surfacing first elements and second selection components for surfacing second elements, with each of the elements corresponding to a media file. Then, in block 1720, the first selection components and the second selection components are arranged such that at least a portion of the first selection components and the second selection components are positioned in an overlying relationship. As such, a first location on the user interface corresponds to each of a first media file associated with the first selection components and a second media file associated with the second selection components.

Next, a combination sort is applied that reflects this selected graphical sort alignment. In some embodiments, a user input may be retrieved by the computing device via the user interface, with the user input corresponding to manipulation of the first selection components such that at least one of a size or orientation of the first selection components may be altered.

In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs.

Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A method implemented in a computing device for providing access to media content, comprising:
   providing, with the computing device, access to media files and attributes associated with the media files;
   generating a user interface on a touchscreen display of the computing device, the user interface comprising first selection components and second selection components, the first selection components for surfacing first datatypes corresponding to the media files based on a first of the attributes, the second selection components for surfacing second datatypes corresponding to the media files based on a second of the attributes such that the first selection components are utilized to sort the first datatypes and the second selection components are utilized to sort the second datatypes,
   wherein generating the user interface comprises:
      providing the first selection components with a first axis and a second axis, the second axis intersecting the first axis; and
      providing the second selection components with a third axis and a fourth axis, the third axis intersecting the fourth axis;
   arranging the first selection components and the second selection components with at least a portion of the first selection components and the second selection components being positioned in an overlying relationship;
   using position information associated with an input event of the first selection components and the second selection components to identify a first location on the user interface, the first location corresponding to a first media file exhibiting the first of the attributes associated with the first selection components and the second of the attributes associated with the second selection components; and
   retrieving, by the computing device, an input via the user interface to alter the overlying relationship of the first selection components and the second selection components such that the first location corresponds to a media file different than the first media file after the overlying relationship has been altered.

2. The method of claim 1, further comprising retrieving, by the computing device, a user input via the user interface, the user input comprising manipulation of the first selection components such that a size of the first selection components is altered.

3. The method of claim 2, wherein the size of the first selection components is altered by a pinch zoom gesture.

4. The method of claim 1, wherein alter the overlying relationship comprises a multi-finger rotation gesture such that the orientation of the first selection components is altered.

5. The method of claim 1, further comprising:
   displaying datatypes corresponding to the media files;
   retrieving a selection of at least one of the displayed datatypes; and
   retrieving at least one of the media files according to the selection.

6. The method of claim 1, wherein, in providing the first selection components, each axis corresponds to an attribute type associated with the media files.

7. The method of claim 6, wherein, in providing the first selection components, each axis comprises slider bar controls.

8. The method of claim 1, further comprising, responsive to a user input corresponding to the first location, providing content associated with the first media file and the second media file to the user.

9. A system for providing access to media content, comprising:
   a computing device having a touchscreen display; and a user interface application executable in the computing device, the user interface application comprising:

logic configured to provide access to media files and attributes associated with the media files;

logic configured to generate a user interface on the touchscreen display, the user interface comprising first selection components and second selection components, the first selection components for surfacing first datatypes corresponding to the media files based on a first of the attributes, the second selection components for surfacing second datatypes corresponding to the media files based on a second of the attributes such that the first selection components are utilized to sort the first datatypes and the second selection components are utilized to sort the second and datatypes, wherein generating the user interface comprises:

providing the first selection components with a first axis and a second axis, the second axis intersecting the first axis; and providing the second selection components with a third axis and a fourth axis, the third axis intersecting the fourth axis;

logic configured to arrange the first selection components and the second selection components with at least a portion of the first selection components and the second selection components being positioned in an overlying relationship;

logic configured to identify a first location on the user interface using position information associated with an input event of the first selection components and the second selection components, the first location corresponding to a first media file exhibiting the first of the attributes associated with the first selection components and the second of the attributes associated with the second selection components; and logic configured to retrieve an input via the user interface to alter the overlying relationship of the first selection components and the second selection components such that the first location corresponds to a media file different than the first media file after the overlying relationship has been altered.

10. The system of claim 9, wherein the datatypes correspond to one or more of music files, video files, digital photos or document files.

11. The system of claim 9, wherein the user interface application further comprises:

logic configured to retrieve, by the computing device, a user input via the user interface, the user input comprising manipulation of the first selection components such that a size of the first selection components is altered.

12. The system of claim 9, wherein the user interface application further comprises:

logic configured to display datatypes corresponding to the media files;

logic configured to retrieve a selection of at least one of the displayed datatypes; and logic configured to retrieve at least one of the media files according to the selection.

13. The system of claim 9, wherein the attributes comprise one of file age, file size, genre, and location.

14. The system of claim 9, wherein each axis comprises slider bar controls.

15. The system of claim 14, wherein respective ends of each of the slider bar controls correspond to upper and lower extreme values corresponding to the attributes.

16. The system of claim 15, wherein the upper and lower extreme values are specified by the user.

17. The system of claim 9, wherein the logic configured to generate the user interface comprises logic configured to provide content associated with the first media file to the user responsive to a user input corresponding to the first location.

18. The system of claim 9, wherein the computing device is a portable electronic device.

* * * * *